(12) United States Patent
Marten et al.

(10) Patent No.: US 9,637,171 B2
(45) Date of Patent: *May 2, 2017

(54) FRAME RAIL FOR A VEHICLE

(71) Applicant: Magna International Inc., Aurora (CA)

(72) Inventors: Zachary Marten, Rochester Hills, MI (US); Frank N. Casali, Shelby Township, MI (US)

(73) Assignee: Magna International Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/707,400

(22) Filed: May 8, 2015

(65) Prior Publication Data

US 2015/0239502 A1    Aug. 27, 2015

Related U.S. Application Data

(62) Division of application No. 13/819,795, filed as application No. PCT/US2011/049630 on Aug. 30, 2011, now Pat. No. 9,045,162.

(60) Provisional application No. 61/378,111, filed on Aug. 30, 2010.

(51) Int. Cl.
| | |
|---|---|
| *B62D 21/02* | (2006.01) |
| *B62D 65/00* | (2006.01) |
| *B62D 29/00* | (2006.01) |
| *B23K 20/00* | (2006.01) |
| *B23K 20/02* | (2006.01) |
| *B23K 31/02* | (2006.01) |

(52) U.S. Cl.
CPC ............ *B62D 21/02* (2013.01); *B23K 20/002* (2013.01); *B23K 20/028* (2013.01); *B23K 31/02* (2013.01); *B62D 29/005* (2013.01); *B62D 29/008* (2013.01); *B62D 65/00* (2013.01); *Y10T 29/49622* (2015.01); *Y10T 428/12229* (2015.01)

(58) Field of Classification Search
CPC ... B62D 21/02; B62D 65/00; Y10T 29/49622; Y10T 428/12229
USPC .......................... 280/781, 784, 785, 797, 800
See application file for complete search history.

(56) References Cited

U.S. PATENT DOCUMENTS

| | | | | |
|---|---|---|---|---|
| 2,189,719 | A * | 2/1940 | Wallace ................. | B62D 21/02 280/781 |
| 2,728,587 | A * | 12/1955 | McKinley .............. | B62D 21/02 280/797 |
| 3,209,432 | A * | 10/1965 | Cape ..................... | B21C 37/065 29/417 |
| 4,726,166 | A | 2/1988 | DeRees | |
| 5,314,229 | A | 5/1994 | Matuzawa et al. | |

(Continued)

*Primary Examiner* — Toan To
(74) *Attorney, Agent, or Firm* — Dickinson Wright PLLC

(57) ABSTRACT

A frame rail for a vehicle has a pair of elongated structural members, each one of the pair of elongated structural members having flanges protruding from lateral edges thereof. The flanges of one of the pair of elongated structural members extend in a direction toward the flanges of the other one of the pair of elongated structural members. The frame rail also has first and second metallic web panels interconnecting the pair of elongated structural members. Overall, the frame rail has a box beam structure, wherein at least a major portion of each one of the first and second metallic web panels has a material thickness that is less than a material thickness of at least a major portion of each one of the pair of elongated structural members.

22 Claims, 5 Drawing Sheets

(56) References Cited

U.S. PATENT DOCUMENTS

| | | | | |
|---|---|---|---|---|
| 5,876,078 A | * | 3/1999 | Miskech | B60R 19/18 293/132 |
| 6,409,239 B1 | * | 6/2002 | Tjoelker | F16F 7/127 188/376 |
| 6,474,708 B1 | * | 11/2002 | Gehringhoff | B60R 19/18 188/376 |
| 6,554,333 B2 | * | 4/2003 | Shimotsu | F16F 7/125 293/132 |
| 6,592,158 B2 | * | 7/2003 | Kettler | B21D 5/08 188/371 |
| 6,688,661 B2 | * | 2/2004 | Yamamoto | B60R 19/18 273/154 |
| 6,705,653 B2 | * | 3/2004 | Gotanda | B60R 19/34 293/132 |
| 6,733,040 B1 | * | 5/2004 | Simboli | B62D 21/02 280/784 |
| 7,070,217 B2 | * | 7/2006 | Longo | B60R 19/34 293/132 |
| 2005/0012362 A1 | | 1/2005 | Patberg et al. | |
| 2006/0201274 A1 | | 9/2006 | Nakajima et al. | |

\* cited by examiner

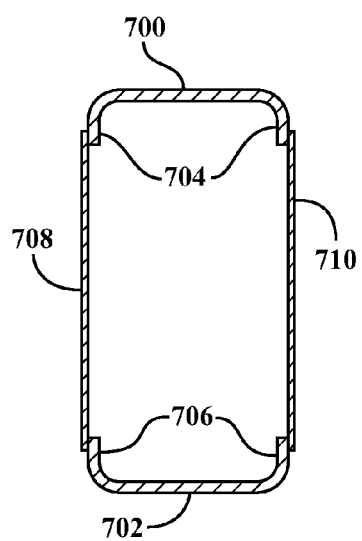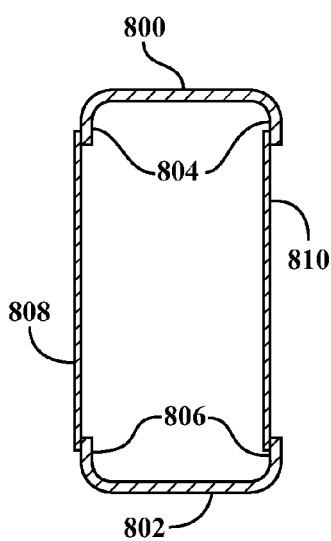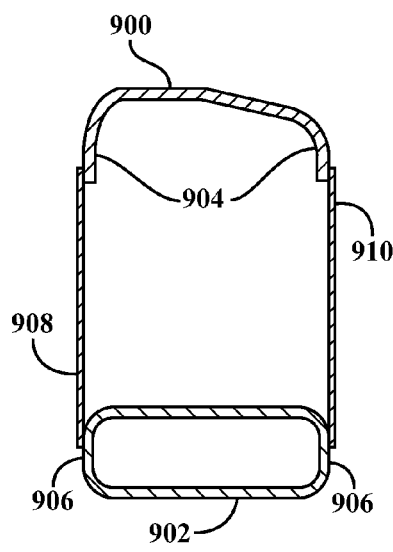
FIG. 7  FIG. 8  FIG. 9
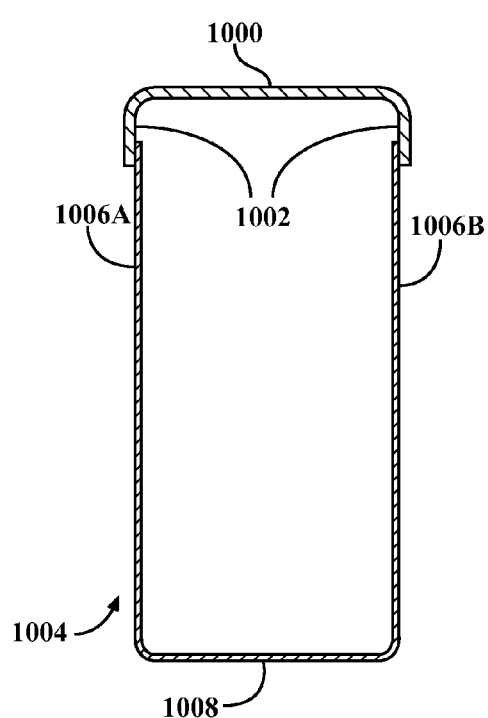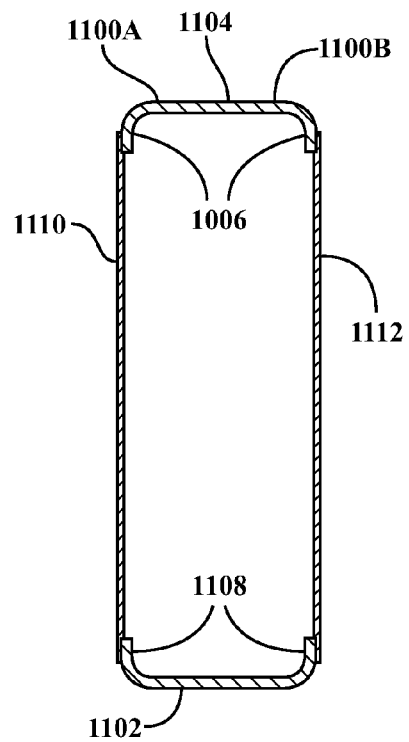
FIG. 10  FIG. 11

US 9,637,171 B2

FRAME RAIL FOR A VEHICLE

CROSS-REFERENCE TO RELATED APPLICATIONS

This Divisional patent application claims the benefit of U.S. National Stage patent application Ser. No. 13/819,795 filed Feb. 28, 2013, entitled "Frame Rail For A Vehicle" which claims the benefit of International Application serial number PCT/US11/49630 filed Aug. 30, 2011, entitled "Frame Rail For A Vehicle" which claims the benefit of U.S. Provisional Patent Application Ser. No. 61/378,111 filed Aug. 30, 2010, entitled "Frame Rail For A Vehicle," the entire disclosures of the applications being considered part of the disclosure of this application, and hereby incorporated by reference.

FIELD OF THE INVENTION

The instant invention relates generally to a frame rail for a vehicle, and more particularly to a lightweight frame rail.

BACKGROUND OF THE INVENTION

In the automobile industry, there has been a relatively recent trend toward limiting the overall weight of automotive vehicles. Automobiles that are lighter in weight tend to offer better fuel efficiency and often are less expensive to produce and manufacture. As a result of this trend, much attention has been given to reducing the weight of various components, such as body panels, including but not limited to, door panels, deck lids, body side panels, hoods, trunk lids and headliners, among others. Materials such as lightweight aluminum alloys, ceramics, high durable plastics, and foams are often used to form such lightweight body panels.

Likewise, much attention has also been given to reducing the weight of vehicle engines, since engines account for a significant portion of the vehicles overall weight. For example, ceramic materials are now commonly used in the production of engine components, including the engine block itself. Ceramic materials tend to have strength characteristics comparable to metals, and also offer good heat resistance characteristics.

With the advent of lighter weight body panels and vehicle engines, the need for excessively heavy vehicle frames and chassis have been greatly reduced. Accordingly, it would be advantageous to provide a lightweight vehicle frame rail that is relatively inexpensive to produce and manufacture and which has enhanced load handling capabilities.

SUMMARY OF EMBODIMENTS OF THE INVENTION

In accordance with an aspect of an embodiment of the invention there is provided a frame rail for a vehicle, comprising: a pair of elongated structural members, each one of said pair of elongated structural members having flanges protruding from lateral edges thereof, said flanges of one of said pair of elongated structural members extending in a direction toward the flanges of the other one of said pair of elongated structural members; and, first and second metallic web panels interconnecting the pair of elongated structural members so as to form a box beam structure, at least a major portion of each one of the first and second metallic web panels having a material thickness that is substantially less than a material thickness of at least a major portion of each one of the pair of elongated structural members.

In accordance with the aforesaid aspect of the instant invention, each one of the first and second metallic web panels is substantially planar.

In accordance with an aspect of an embodiment of the invention there is provided a frame rail for a vehicle, comprising: a first elongated structural member having a first width defined between opposite edges thereof, and having first lateral surfaces along each of said opposite edges, said first lateral surfaces extending along at least a portion of a length of the first elongated structural member; a second elongated structural member having a second width defined between opposite edges thereof, and having second lateral surfaces along each of said opposite edges, said second lateral surfaces extending along at least a portion of a length of the second elongated structural member; and, first and second metallic web panels interconnecting the first and second elongated structural members so as to form a box beam structure, each one of the first and second metallic web panels being substantially planar.

In accordance with the aforesaid aspect of the instant invention, each one of the first and second metallic web panels is substantially planar.

In accordance with an aspect of an embodiment of the invention there is provided a frame rail for a vehicle, comprising: a pair of elongated structural members, each one of said pair of elongated structural members having a first lateral edge and having a second lateral edge that is opposite the first lateral edge, the first and second lateral edges extending in a direction along a length of the frame rail, and each one of said pair of elongated structural members having a first flange extending from the first lateral edge and having a second flange extending from the second lateral edge, said first and second elongated structural members disposed in a facing arrangement, with the first and second flanges of one of said pair of elongated structural members opposing, respectively, the first and second flanges of the other one of said pair of elongated structural members; and, a first metallic web panel fixedly secured to the first flanges of said pair of elongated structural members and a second metallic web panel fixedly secured to the second flanges of said pair of elongated structural members, wherein said first and second metallic web panels are substantially planar and extend along the length of the frame rail.

In accordance with an aspect of an embodiment of the invention there is provided a chassis for a vehicle, comprising: a pair of frame rails and at least one cross member, at least one of the frame rails comprising: a pair of elongated structural members, each one of said pair of elongated structural members having flanges protruding from the lateral edges thereof, said flanges of one of said pair of elongated structural members extending in a direction toward the flanges of the other one of said pair of elongated structural members, and first and second metallic web panels interconnecting the pair of elongated structural members so as to form a box beam structure, at least a major portion of each one of the first and second metallic web panels having a material thickness that is substantially less than a material thickness of at least a major portion of each one of the pair of elongated structural members.

According to aforesaid aspect of the instant invention, each one of the first and second metallic web panels is substantially planar.

In accordance with an aspect of an embodiment of the invention there is provided a frame rail for a vehicle, comprising: a first elongated structural member comprising first and second structural member portions, each one of the first and second structural member portions having an outer edge and an inner edge, the inner edges of the first and second structural member portions being butt-welded together, and the outer edge of each one of the first and second structural member portions having a first flange protruding therefrom, each said first flange extending along at least a portion of a length of the first elongated structural member; a second elongated structural member having first and second outside edges, a second flange protruding from each one of the first and second outside edges of the second elongated structural member, each said second flange extending along at least a portion of a length of the second elongated structural member; and, first and second metallic web panels interconnecting the first and second elongated structural members so as to form a box beam structure, a material thickness of at least a major portion of each one of the first and second metallic web panels being substantially less than a material thickness of at least a major portion of each one of the first and second elongated structural members.

In accordance with an aspect of an embodiment of the invention there is provided a frame rail for a vehicle, comprising: a first elongated structural member having a first width defined between opposite edges thereof, and having first lateral surfaces along each of said opposite edges, said first lateral surfaces extending along at least a portion of a length of the first elongated structural member; a second elongated structural member having a second width defined between opposite edges thereof, and having second lateral surfaces along each of said opposite edges, said second lateral surfaces extending along at least a portion of a length of the second elongated structural member; and, first and second metallic web panels interconnecting the first and second elongated structural members, wherein the first elongated structural member comprises a first structural member portion and a second structural member portion, the first structural member portion and the second structural member portion each having an inwardly facing edge, and the first structural member portion and the second structural member portion being fixedly joined together along said inwardly facing edges thereof.

In accordance with an aspect of an embodiment of the invention there is provided a method of making a frame rail for a vehicle, comprising: providing a blank, the blank comprising a plurality of joined together sections, some of the plurality of joined together sections having a material thickness extending over at least a major portion thereof that is less than a material thickness extending over at least a major portion of others of the plurality of joined together sections, a first section being disposed along a first lateral edge of the blank and having a same material thickness as a second section that is disposed along a second lateral edge of the blank; shaping the blank such that an edge of the first section is aligned with and adjacent to an edge of the second section, the edge of the first section and the edge of the second section extending along a length direction; and, fixedly joining the edge of the first section to the edge of the second section so as to form a frame rail with a closed profile in a cross section taken in a plane that is transverse to the length direction.

In accordance with an aspect of an embodiment of the invention there is provided a blank for use in making a frame rail for a vehicle, the blank comprising: a first elongated metallic section having a width and a length, the first elongated metallic section having a first material thickness extending over at least a major portion thereof; a second and a third elongated metallic section each having a length substantially the same as the first elongated metallic section, the second and the third elongated metallic sections each having a material thickness extending over at least a major portion thereof that is substantially the same as the first material thickness; and, a fourth and a fifth elongated metallic section each having a length substantially the same as the first elongated metallic section, the fourth elongated metallic section being butt-welded along a first edge thereof to the first elongated metallic section and being butt-welded along a second edge thereof that is opposite the first edge to the second elongated metallic section, the fifth elongated metallic section being butt-welded along a first edge thereof to the first elongated metallic section and being butt-welded along a second edge thereof that is opposite the first edge to the third elongated metallic section, a material thickness of at least a major portion of each one of the fourth and fifth elongated metallic sections being substantially less than the first material thickness.

In accordance with an aspect of an embodiment of the invention there is provided a frame rail for a vehicle, comprising: an elongated structural member having a central portion and having flanges protruding from opposite lateral edges of said central portion, said flanges being substantially parallel one relative to the other and extending in a same direction away from said central portion; and, a metallic web panel having a first sidewall portion, a second sidewall portion, and a floor portion that spans between the first sidewall portion and the second sidewall portion, the first sidewall portion being fixedly secured along an edge region thereof to one of said flanges protruding from the central portion of the elongated structural member and the second sidewall portion being fixedly secured along an edge region thereof to the other one of said flanges protruding from the central portion of the elongated structural member, and wherein at least a major portion the metallic web panel has a material thickness that is substantially less than a material thickness of at least a major portion of the elongated structural member.

In accordance with an aspect of an embodiment of the invention there is provided a frame rail for a vehicle, comprising: an elongated structural member having a first lateral edge and having a second lateral edge that is opposite the first lateral edge, the first and second lateral edges extending along a length of the frame rail, the elongated structural member having a first flange protruding from the first lateral edge and having a second flange protruding from the second lateral edge, the first and second flanges extending away from a first side of the elongated structural member; and, a shaped metallic web panel disposed in a facing arrangement with the first side of the elongated structural member, the shaped metallic web panel having a first edge fixedly secured to the first flange and having a second edge fixedly secured to the second flange, the shaped metallic web panel including a first sidewall portion, a second sidewall portion, and a floor portion that is continuous with and that extends between the first sidewall portion and the second sidewall portion, wherein the first edge is defined along an edge of the first sidewall portion that is farthest from the floor portion and the second edge is defined along an edge of the second sidewall portion that is farthest from the floor portion, and wherein a material thickness of at least a major portion of the shaped metallic web panel is substantially less than a material thickness of at least a major portion of the elongated structural member.

In accordance with an aspect of an embodiment of the invention there is provided a frame rail for a vehicle, comprising: a pair of elongated structural members, each one of said pair of elongated structural members having flanges protruding from lateral edges thereof, said flanges of one of said pair of elongated structural members extending in a direction toward the flanges of the other one of said pair of elongated structural members; and, first and second web panels fabricated from a composite material comprising carbon fibers and interconnecting the pair of elongated structural members so as to form a box beam structure, the first web panel fixedly secured to the flanges of the pair of elongated structural members on a first side of the box beam structure via peripheral regions of the first web panel, and the second web panel fixedly secured to the flanges of the pair of elongated structural members on a second side of the box beam structure via peripheral regions of the second web panel, such that the first web panel is spaced apart from and substantially parallel to the second web panel.

BRIEF DESCRIPTION OF THE DRAWINGS

Exemplary embodiments of the invention will now be described in conjunction with the following drawings, in which:

FIG. 7 is a cross sectional end view of a first frame rail having an aspect ratio (height to width) of approximately 2:1, according to an embodiment of the instant invention;

FIG. 8 is a cross sectional end view of a second frame rail having an aspect ratio (height to width) of approximately 2:1, according to an embodiment of the instant invention;

FIG. 9 is a cross sectional end view of a frame rail having a double box beam structure, according to an embodiment of the instant invention;

FIG. 10 is a cross sectional end view of a frame rail for a vehicle, according to a second embodiment of the instant invention;

FIG. 11 is a cross sectional end view of a frame rail for a vehicle, according to a third embodiment of the instant invention;

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Conventional automotive vehicle frame rails offer good structural characteristics, but at the same time they are considered to be unnecessarily heavy and contribute to unacceptably low fuel efficiency. In particular, the material thickness is not optimized within different regions of the prior art vehicle frame rails.

Figure 1:
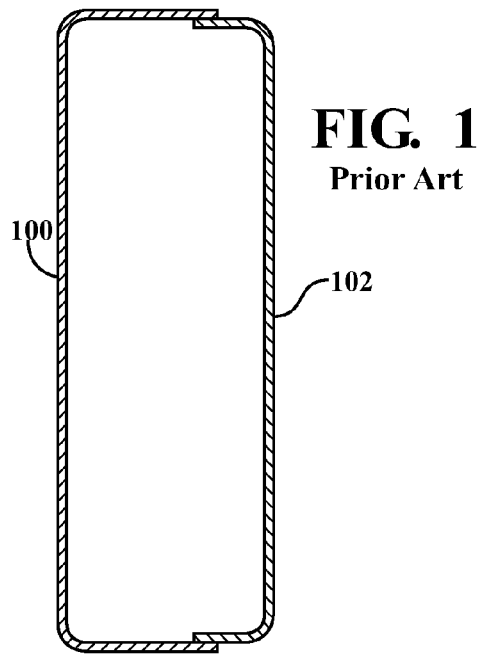
FIG. 1 is a cross-sectional end view of a frame rail for a vehicle, according to the prior art.
Figure 2:
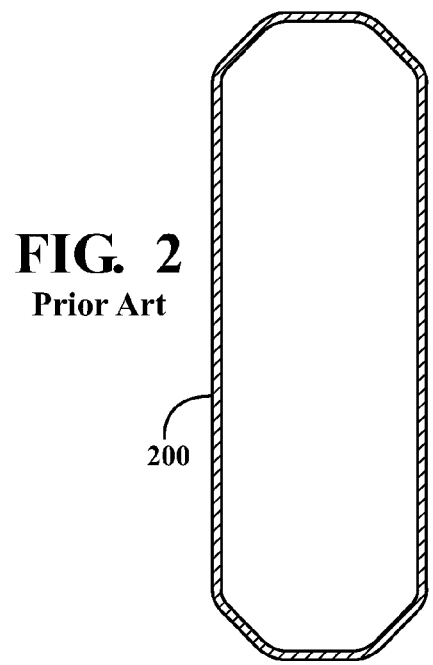
FIG. 2 is a cross-sectional end view of another frame rail for a vehicle, according to the prior art.

Referring to FIG. 1, a hollow frame rail according to the prior art is shown in which two clamshell sections 100 and 102 are welded together. Each of the two clamshell sections 100 and 102 are of a same, uniform thickness. Referring to FIG. 2, shown is another hollow frame rail according to the prior art, in which a butt-welded tube has been formed by hydro-forming into a rail 200, which also has uniform cross-sectional thickness. In each of the prior art examples, the material thickness of the frame rail is uniform throughout. Further, the hydro-forming process is expensive. Further still, in each of the prior art examples it is necessary to re-tool in order to change the height of the frame rails.

Figure 3:
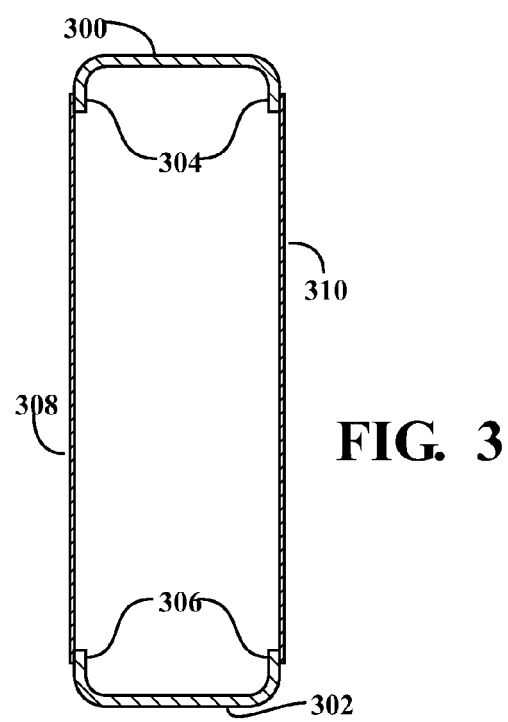
FIG. 3 is a cross-sectional end view of a frame rail for a vehicle, according to a first embodiment of the instant invention.

Referring now to FIG. 3, shown is a cross-sectional view of a vehicle frame rail according to a first embodiment of the instant invention, the cross-section taken in a plane that is normal to a length of the vehicle frame rail. The vehicle frame rail comprises a pair of elongated structural members 300 and 302. In the embodiment that is shown in FIG. 3, the cross-sectional shape and the thickness of each of the elongated structural members 300 and 302 are substantially identical. By way of a specific and non-limiting example, the elongated structural members 300 and 302 are stamped parts fabricated from steel, such as for instance one of mild strength uncoated steel and high tensile strength corrosion resistant steel.

Each one of said pair of elongated structural members 300 and 302 has a flange protruding from each of the lateral edges thereof. The elongated structural members 300 and 302 are arranged facing one another, such that flanges 304 of the elongated structural member 300 oppose flanges 306 of the elongated structural member 302. The flanges 304 and 306 define lateral surfaces of the elongated structural members 300 and 302, respectively.

Referring still to FIG. 3, a first metallic web panel 308 and a second metallic web panel 310 interconnect the pair of elongated structural members 300 and 302, so as to form a box beam structure. Each one of the first and second metallic web panels 308 and 310 is substantially planar, and at least a major portion of each one of the first and second metallic web panels 308 and 310 has a material thickness that is substantially less than a material thickness of at least a major portion of each one of the pair of elongated structural members 300 and 302. Optionally, the first and second metallic web panels 308 and 310 are made from the same material as the pair of elongated structural members 300 and 302. Alternatively, the first and second metallic web panels 308 and 310 are made from a different material than the pair of elongated structural members 300 and 302. By way of a few specific and non-limiting examples, the first and second metallic web panels 308 and 310 are made from one of steel and aluminum, such as for instance a metal or metal alloy selected from the group consisting of mild strength uncoated steels, high tensile strength corrosion resistant steels and high strength aluminum. According to at least one embodiment, the first and second metallic web panels 308 and 310 are of generally uniform material thickness. In this embodiment, the major portion extends over substantially the entire first and second metallic web panels 308 and 310.

The first and second metallic web panels 308 and 310 are fixedly secured to the pair of elongated structural members 300 and 302. In particular, the first and second metallic web panels 308 and 310 are one of welded, mechanically fastened and adhesively bonded to the pair of elongated structural members 300 and 302 via flanges 304 and 306, respectively. Non-limiting examples of welding include laser welding and metal inert gas (MIG) welding. Non-limiting examples of mechanical fastening include riveting, and attachment using screws or bolts. Securing via welding is employed typically when the elongated structural members 300 and 302 and the first and second metallic web panels 308 and 310 are made from the same material, such as for instance steel. On the other hand, when the elongated structural members 300 and 302 and the first and second metallic web panels 308 and 310 are made from different materials, then either mechanical fastening or adhesive bonding is preferred. Of course, when mechanical fastening is used instead of welding, for securing the first and second metallic web panels 308 and 310 to the elongated structural members 300 and 302, then increased overlap of the flanges 304 and 306 with the first and second metallic web panels 308 and 310 is provided in order to accommodate the installation of bolts or screws.

The use of first and second metallic web panels having a material thickness less than that of the pair of elongated structural members, and/or being made from a lighter weight material than the pair of elongated structural members, results in lighter weight closed section vehicle frame rails compared to the prior art. In the embodiment that is shown in FIG. 3, the two higher gage elongated structural members 300 and 302 are provided at the extreme fiber (i.e., they are the parts farthest from the horizontal neutral axis), and are connected to each other via the lower gage first and second metallic web panels 308 and 310. In this way, weight savings are achieved with substantially no degradation of performance. The stresses occur on the extreme fiber, which correspond to structural components formed from the higher gage material. As such, the frame rail according to the embodiment that is shown in FIG. 3 is stiff in bending about the horizontal neutral axis.

In an alternative embodiment, web panels that are fabricated from a suitable composite material are substituted for the first and second metallic web panels 308 and 310. In the alternative embodiment, the composite material web panels are mechanically fastened or adhesively bonded to the pair of elongated structural members 300 and 302 via the flanges 304 and 306, respectively. Further alternatively, the web panels 308 and 310 are not planar, but rather they may be contoured and/or include indented and/or raised sections, etc.

Figure 4:
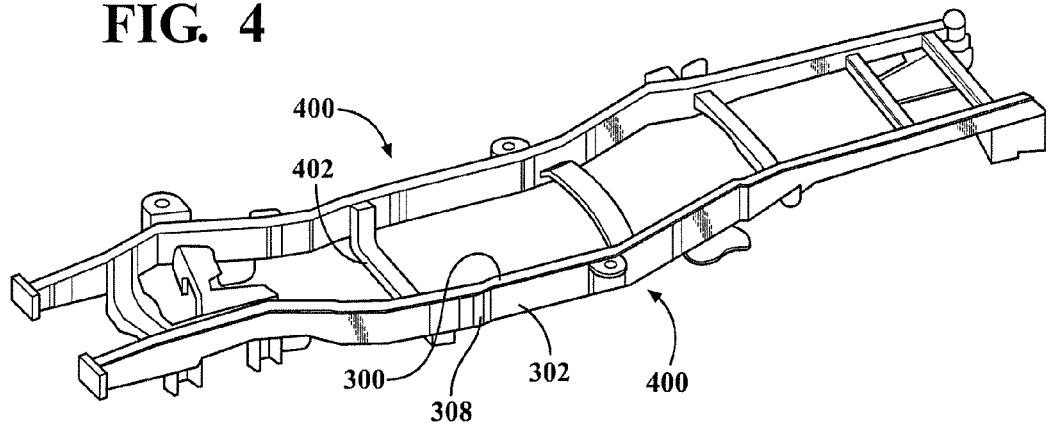
FIG. 4 is a perspective view of a vehicle chassis including a frame rail according to an embodiment of the instant invention.

Referring now to FIG. 4, shown is a chassis including a pair of frame rails 400 according to an embodiment of the instant invention. Each frame rail 400 includes the pair of elongated structural members 300 and 302, which are interconnected via the first metallic web panel 308 and the second metallic web panel 310 (not shown in FIG. 4). Each side of the chassis is constructed from a plurality of sections, and the two sides of the chassis are connected by cross members, such as for instance the illustrative cross member 402. The arrows in FIG. 4 indicate some of the sections of the chassis within which the frame rails according to the instant invention may be employed. In general, the aspect ratio (height to width) of the indicated sections is 2:1 or greater.

The first and second metallic web panels 308 and 310 allow for attachment to other frame components, such as cross member 402, engine mounts or spring hangers by welding, riveting or bolting.

Figure 5:
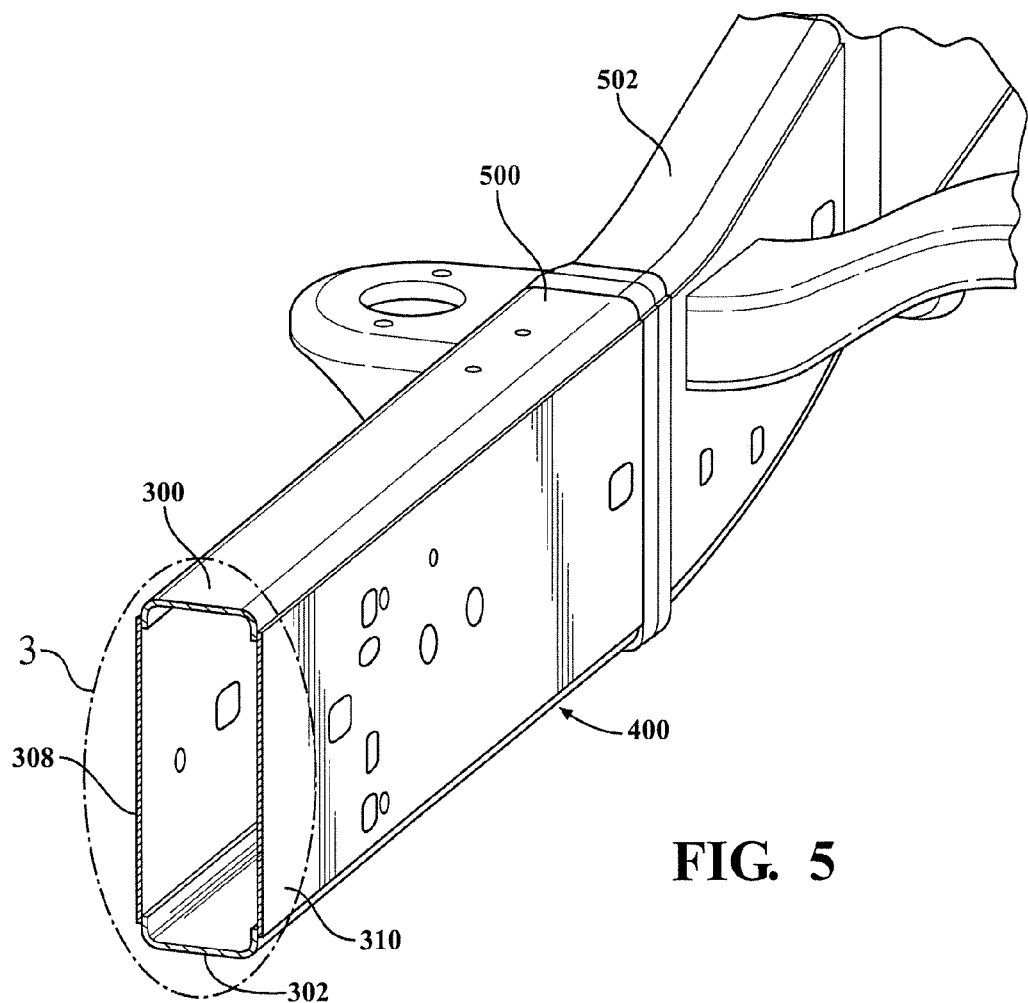
FIG. 5 is an enlarged perspective view of a portion of the vehicle chassis showing detail of a frame rail according to the first embodiment of the instant invention.

Referring now to FIG. 5, shown is an enlarged perspective view of a portion of the chassis within the dashed oval of FIG. 4, according to the first embodiment of the instant invention. A first frame rail 500 is coupled together with a second frame rail 502 in the longitudinal direction of the chassis. The first and second metallic web panels 308 and 310 are fixedly secured to the outer lateral surfaces provided along the flanged edges of the pair of elongated structural members. In this section of the chassis, the aspect ratio (height to width) is approximately 3:1.

Figure 6A:
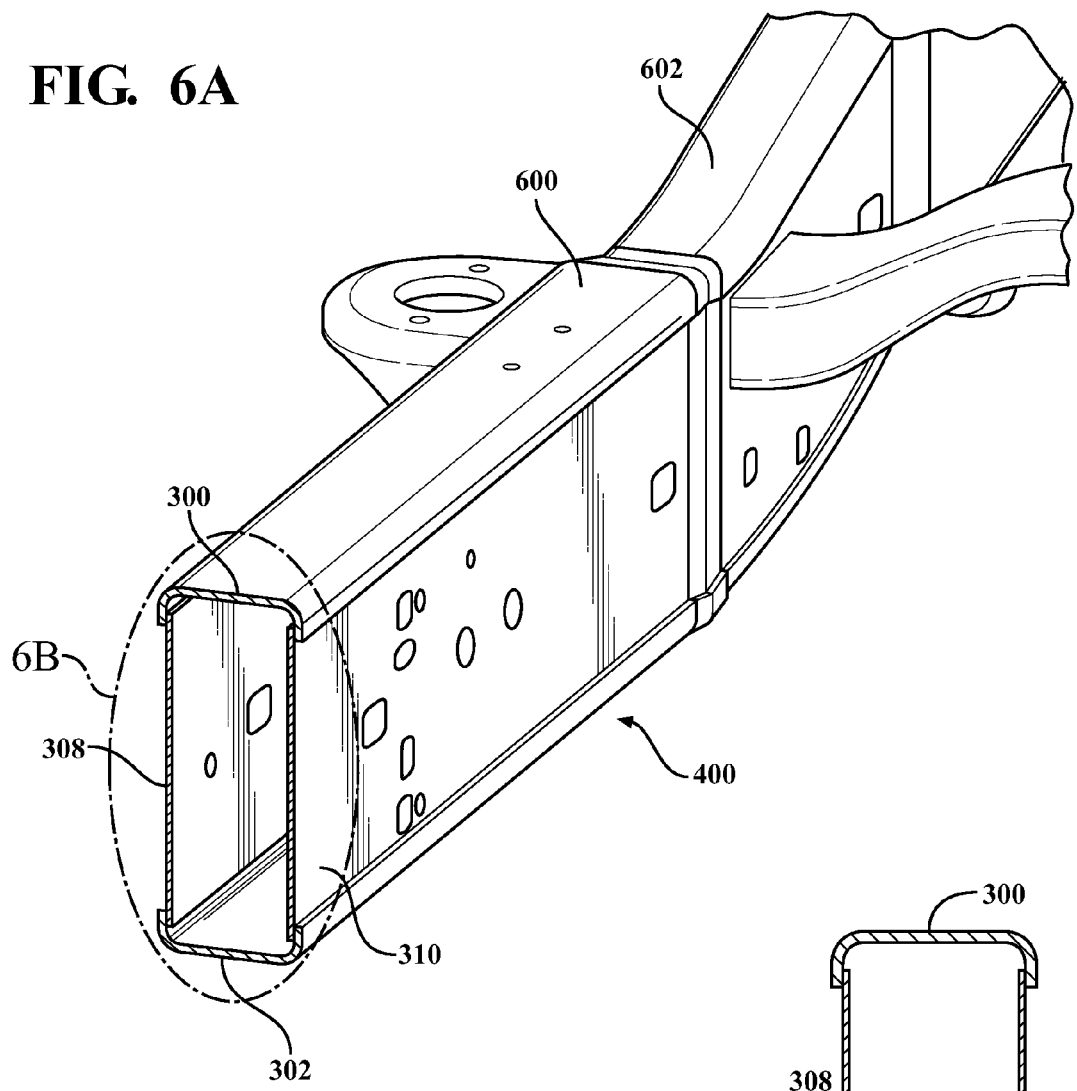
FIG. 6A is an enlarged perspective view of the portion of the vehicle chassis within the dashed oval of FIG. 4, showing detail of a frame rail according to a second embodiment of the instant invention.
Figure 6B:
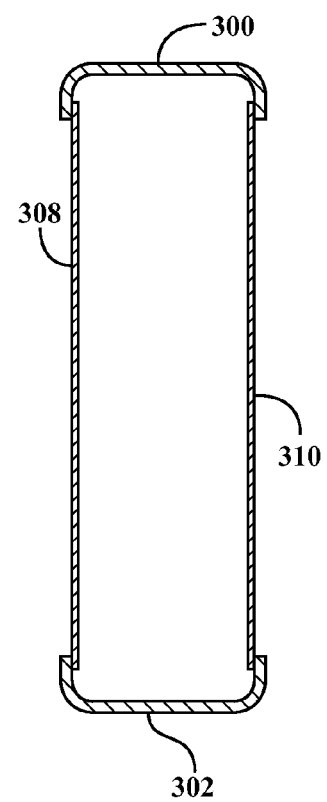
FIG. 6B is an enlarged cross sectional end view of the frame rail of FIG. 6A.

Referring now to FIG. 6A, shown is an enlarged perspective view of a portion of the chassis within the dashed oval of FIG. 4, according to a second embodiment of the instant invention. A first frame rail 600 is coupled together with a second frame rail 602 in the longitudinal direction of the chassis. As is shown in greater detail in FIG. 6B, the first and second metallic web panels 308 and 310 are fixedly secured to the inner lateral surfaces provided along the flanged edges of the pair of elongated structural members. In this section of the chassis, the aspect ratio (height to width) is approximately 3:1.

Referring now to FIG. 7, shown is a cross sectional end view of a frame rail having an aspect ratio (height to width) of approximately 2:1. The frame rail shown in FIG. 7 is substantially similar to the frame rail shown in FIG. 3. In particular, a first elongated structural member 700 with flanges 704 extending from lateral edges thereof is spaced apart and facing a second elongated structural member 702 with flanges 706 extending from lateral edges thereof. First and second metallic web panels 708 and 710 are secured to the flanges 704 and 706, so as to interconnect the first and second elongated structural members 700 and 702. In FIG. 7, the first and second metallic web panels 708 and 710 are both secured to outside lateral surfaces provided along the flanges 704 and 706.

In an alternative embodiment, web panels that are fabricated from a suitable composite material, such as for instance carbon fiber, are substituted for the first and second metallic web panels 708 and 710. In the alternative embodiment, the composite material web panels are mechanically fastened or adhesively bonded to the pair of elongated structural members 700 and 702 via the flanges 704 and 706, respectively. Further alternatively, the web panels 708 and 710 are not planar, but rather they may be contoured and/or include indented and/or raised sections, etc.

Referring now to FIG. 8, shown is a cross sectional end view of a frame rail having an aspect ratio (height to width) of approximately 2:1. The frame rail shown in FIG. 8 is substantially similar to the frame rail shown in FIG. 3. In particular, a first elongated structural member 800 with flanges 804 extending from lateral edges thereof are spaced apart and facing a second elongated structural member 802 with flanges extending from lateral edges thereof. First and second metallic web panels 808 and 810 are secured to the flanges 804 and 806, so as to interconnect the first and second elongated structural members 800 and 802. In FIG. 8, the first metallic web panel 808 is secured to the outside lateral surfaces provided along the flanges 804 and 806, and the second metallic web panel 810 is secured to inside lateral surfaces provided along the flanges 804 and 806.

In an alternative embodiment, web panels that are fabricated from a suitable composite material are substituted for the first and second metallic web panels 808 and 810. In the alternative embodiment, the composite material web panels are mechanically fastened or adhesively bonded to the pair of elongated structural members 800 and 802 via the flanges 804 and 806, respectively. Further alternatively, the web panels 808 and 810 are not planar, but rather they may be contoured and/or include indented and/or raised sections, etc.

Referring now to FIG. 9, shown is a cross sectional end view of a frame rail having a double box beam structure. In the embodiment that is shown in FIG. 9, the shape of the first elongated structural member 900 is different than the shape of the second elongated structural member 902. In particular, the second elongated structural member is provided in the form of a box beam, having lateral surfaces defined along the outer sides 906 thereof. The first elongated structural member 900 has flanges 904 extending from the lateral edges thereof, and is spaced apart from the second elongated structural member 902 with the flanges 904 directed toward the second elongated structural member 902. First and second metallic web panels 908 and 910 are secured to the flanges 904 and to the outer sides 906 of the second elongated structural member 902, so as to interconnect the first and second elongated structural members 900 and 902. The resulting double box beam structure increases the torsional rigidity of the frame rail.

In an alternative embodiment, web panels that are fabricated from a suitable composite material are substituted for the first and second metallic web panels 908 and 910. In the alternative embodiment, the composite material web panels are mechanically fastened or adhesively bonded to the pair of elongated structural members 900 and 902 via the flanges 904 and 906, respectively. Further alternatively, the web panels 908 and 910 are not planar, but rather they may be contoured and/or include indented and/or raised sections, etc.

Referring now to FIG. 10, shown is a cross-sectional view of a vehicle frame rail according to another embodiment of the instant invention, the cross-section taken in a plane that is normal to a length of the vehicle frame rail. The vehicle frame rail comprises a single elongated structural member 1000. By way of a specific and non-limiting example, the elongated structural member 1000 is a stamped part fabricated from steel, such as for instance one of mild strength uncoated steel and high tensile strength corrosion resistant steel.

The elongated structural member 1000 has flanges 1002 protruding from each of the lateral edges thereof. The flanges 1002 define lateral surfaces of the elongated structural member 1000. A substantially U-shaped metallic web panel 1004 interconnects the flanges 1002 of the elongated structural member 1000, so as to form a box beam or closed structure. The substantially U-shaped metallic web panel 1004 has first and second substantially planar sidewall portions 1006a and 1006b, respectively, and a floor portion 1008. The floor portion 1008 is intermediate the first and second sidewall portions 1006a and 1006b, and is opposite the elongated structural member 1000. In the instant embodiment, the first and second sidewall portions 1006a and 1006b are approximately parallel one relative to the other, and the floor portion 1008 and the elongated structural member 1000 are approximately parallel one relative to the other. Accordingly, a closed rectangular profile is formed in the cross section that is shown in FIG. 10. Optionally, the first and second sidewall portions 1006a and 1006b are non-parallel and/or the floor portion 1008 and the elongated structural member 1000 are non-parallel.

Referring still to FIG. 10, at least a major portion of the substantially U-shaped metallic web panel 1004 has a material thickness that is substantially less than a material thickness of at least a major portion of the elongated structural member 1000. Optionally, the substantially U-shaped metallic web panel 1004 is made from the same material as the elongated structural member 1000. Alternatively, the substantially U-shaped metallic web panel 1004 is made from a different material than the elongated structural member 1000. By way of a few specific and non-limiting examples, the substantially U-shaped metallic web panel 1004 is made from one of steel and aluminum, such as for instance a metal or metal alloy selected from the group consisting of mild strength uncoated steels, high tensile strength corrosion resistant steels and high strength aluminum. According to at least one embodiment, the substantially U-shaped metallic web panel 1004 is of generally uniform material thickness. In this embodiment, the major portion extends over substantially the entire substantially U-shaped metallic web panel 1004.

The substantially U-shaped metallic web panel 1004 is fixedly secured to the elongated structural member 1000. In particular, the substantially U-shaped metallic web panel 1004 is one of welded, mechanically fastened, and adhesively bonded to the elongated structural member 1000 via the flanges 1002. Non-limiting examples of welding include laser welding and metal inert gas (MIG) welding. Non-limiting examples of mechanical fastening include riveting, and attachment using screws or bolts. Securing via welding is employed typically when the elongated structural member 1000 and the substantially U-shaped metallic web panel 1004 are made from the same material, such as for instance material ranging from mild strength uncoated to ultra-high strength coated steels. On the other hand, when the elongated structural member 1000 and the substantially U-shaped metallic web panel 1004 are made from different materials, then either mechanical fastening or adhesive bonding is preferred. Of course, when mechanical fastening is used instead of welding, for securing the substantially U-shaped metallic web panel 1004 to the elongated structural member 1000, then increased overlap of the flanges 1002 with the substantially U-shaped metallic web panel 1004 is provided in order to accommodate the installation of bolts or screws.

The use of a substantially U-shaped metallic web panel 1004 having a material thickness less than that of the elongated structural member 1000, and/or being made from a lighter weight material than the elongated structural member 1000, results in lighter weight closed section vehicle frame rails compared to the prior art. In the embodiment that is shown in FIG. 10, the higher gage elongated structural member 1000 is provided at the extreme fiber (i.e., it is the parts farthest from the horizontal neutral axis). In this way, weight savings are achieved with substantially no degradation of performance. The stresses occur on the extreme fiber, which corresponds to a structural component formed from the higher gage material. As such, the frame rail according to the embodiment that is shown in FIG. 10 is stiff in bending about the horizontal neutral axis.

Referring now to FIG. 11, shown is a cross-sectional view of a vehicle frame rail according to a third embodiment of the instant invention, the cross-section taken in a plane that is normal to a length of the vehicle frame rail. In the instant embodiment the vehicle frame rail comprises a pair of elongated structural members 1100 and 1102. Furthermore, the elongated structural member 1100 comprises first and second portions 1100a and 1000b, which are joined together via a butt-weld 1104. In the embodiment that is shown in FIG. 11, the cross-sectional shape and the thickness of each of the elongated structural members 1100 and 1102 are substantially identical. By way of a specific and non-limiting example, the elongated structural members 1100 and 1102 are stamped parts fabricated from steel, such as for instance one of mild strength uncoated steel and high tensile strength corrosion resistant steel.

Each one of said pair of elongated structural members 1100 and 1102 has a flange 1106 or 1108 protruding from each of the lateral edges thereof. The elongated structural members 1100 and 1102 are arranged facing one another, such that flanges 1106 of the elongated structural member 1100 oppose flanges 1108 of the elongated structural member 1102. The flanges 1106 and 1108 define lateral surfaces of the elongated structural members 1100 and 1102, respectively.

Referring still to FIG. 11, a first metallic web panel 1110 is butt-welded along a first edge thereof to one of the flanges 1106 of the elongated structural member 1100, and is butt-welded along a second edge thereof to one of the flanges 1108 of the elongated structural member 1102. In particular, the first edge is opposite the second edge of the first metallic web panel 1110. Similarly, a second metallic web panel 1112 is butt-welded along a first edge thereof to the other flange 1106 of elongated structural member 1100, and is butt-welded along a second edge thereof to the other flange 1108 of elongated structural member 1102. In particular, the first edge is opposite the second edge of the second metallic web panel 1112. The first and second metallic web panels 1110 and 1112 interconnect the pair of elongated structural members 1100 and 1102, so as to form a box beam or closed structure. Each one of the first and second metallic web panels 1110 and 1112 is substantially planar, and at least a major portion of each one of the first and second metallic web panels 1110 and 1112 has a material thickness that is substantially less than a material thickness of at least a major portion of each one of the pair of elongated structural members 1100 and 1102. According to at least one embodiment, the first and second metallic web panels 1110 and 1112 are of generally uniform material thickness. In this embodiment, the major portion extends over substantially the entire first and second metallic web panels 1110 and 1112.

Since the first and second metallic web panels 1110 and 1112 are butt-welded to the pair of elongated structural members 1100 and 1102 via flanges 1106 and 1108, respectively, there is no need to provide a region of overlap therebetween. On the other hand, since the first and second metallic web panels 1110 and 1112 are welded to the pair of elongated structural members 1100 and 1102, it is preferred that the first and second metallic web panels 1110 and 1112 and the elongated structural members 1100 and 1102 are fabricated from the same material, such as for instance steel. By way of a few specific and non-limiting examples, the first and second metallic web panels 1110 and 1112 are made from steel, such as for instance a metal or metal alloy selected from the group consisting of mild strength uncoated steels and high tensile strength corrosion resistant steels.

The use of first and second metallic web panels having a material thickness less than that of the pair of elongated structural members results in lighter weight closed section vehicle frame rails compared to the prior art. In the embodiment that is shown in FIG. 11, the two higher gage elongated structural members 1100 and 1102 are provided at the extreme fiber (i.e. they are the parts farthest from the horizontal neutral axis), and are connected to each other via the lower gage first and second metallic web panels 1110 and 1112. In this way, weight savings are achieved with substantially no degradation of performance. The stresses occur on the extreme fiber, which correspond to structural components formed from the higher gage material. As such, the frame rail according to the embodiment that is shown in FIG. 11 is stiff in bending about the horizontal neutral axis.

Figure 12A:
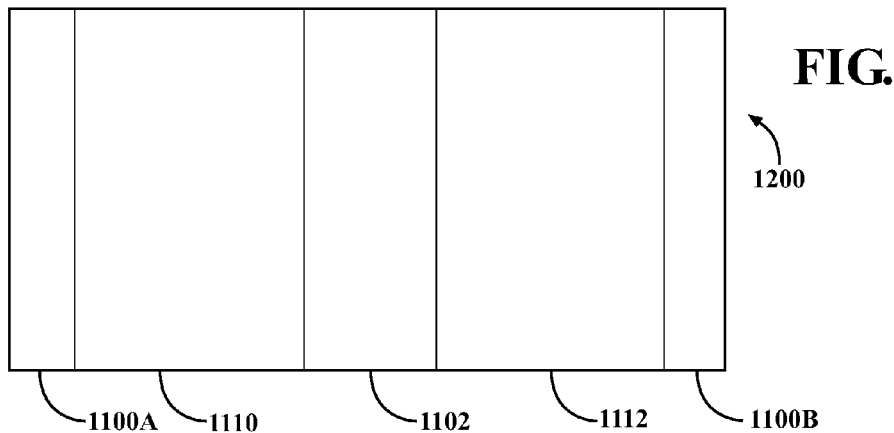
FIG. 12A shows a blank having different portions of different material thicknesses, the blank for use in a process for making the frame rail of FIG. 11.

FIG. 12A shows a blank 1200 with different sections thereof being formed with different material thicknesses, the blank for use in a process for making the frame rail of FIG. 11. In particular, blank 1200 has a section of relatively greater material thickness that corresponds to the elongated structural member 1102, as well as sections of relatively greater material thickness that correspond to the first and second portions 1100a and 1100b, respectively, of the elongated structural member 1100. Further, blank 1200 has a section of relatively lesser material thickness corresponding to the first metallic web panel 1110, and a section of relatively lesser material thickness corresponding to the second metallic web panel 1112. By way of a specific and non-limiting example, the different sections 1100a, 1110, 1102, 1112 and 1100b are butt-welded together along respective edges thereof, so as to form the blank 1200.

Figure 12B:
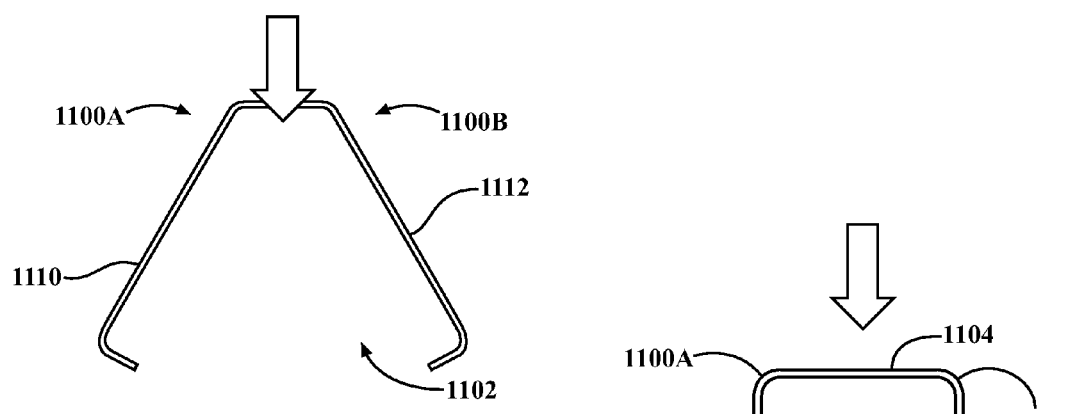
FIG. 12B shows the blank of FIG. 12A during an intermediate stage of being formed into the frame rail of FIG. 11.
Figure 12C:
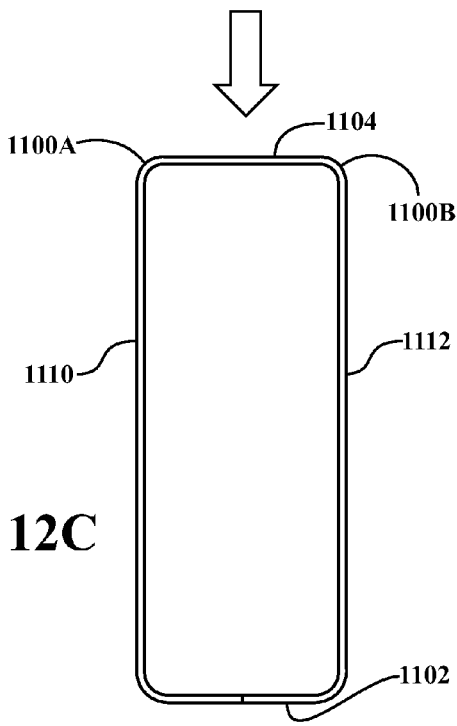
FIG. 12C shows the blank of FIG. 12A subsequent to being formed into the frame rail of FIG. 11.

Referring now to FIG. 12B, shown is the blank 1200 during an intermediate stage of being formed into the frame rail of FIG. 11. By way of a specific and non-limiting example the blank 1200 is formed by die shearing or another suitable process. With additional forming the first and second portions 1100a and 1100b, respectively, are brought together into an edge-to-edge contacting arrangement. Subsequently, the first and second portions 1100a and 1100b are butt-welded together so as to form the elongated structural member 1100, thereby resulting in a closed structure as shown in FIG. 12C.

Numerous other embodiments may be envisaged without departing from the scope of the instant invention.

What is claimed is:

1. A frame rail for a vehicle, comprising:
  a first elongated structural member having a first width defined between opposite edges thereof, and having first lateral surfaces along each of said opposite edges, said first lateral surfaces extending along at least a portion of a length of the first elongated structural member;
  a second elongated structural member having a second width defined between opposite edges thereof, and having second lateral surfaces along each of said opposite edges, said second lateral surfaces extending along at least a portion of a length of the second elongated structural member; and,
  first and second metallic web panels which are spaced from one another and are interconnected with the first and second elongated structural members so as to form a box beam structure, each one of the first and second metallic web panels being substantially planar, wherein a material thickness of at least a major portion of each one of the first and second metallic web panels is substantially less than a material thickness of at least a major portion of each one of the first and second elongated structural members.

2. The frame rail for a vehicle according to claim 1, comprising a pair of first flanges extending one each from the opposite edges of the first elongated structural member, wherein the first lateral surfaces are surfaces of the first flanges.

3. The frame rail for a vehicle according to claim 2, comprising a pair of second flanges extending one each from the opposite edges of the second elongated structural member, wherein the second lateral surfaces are surfaces of the second flanges.

4. The frame rail for a vehicle according to claim 2, wherein the second elongated structural member has a box beam structure, the second lateral surfaces being lateral surfaces of the box beam structure, and wherein the frame rail has a double box beam structure.

5. The frame rail for a vehicle according to claim 1, wherein the first metallic web panel is attached to the one of the first lateral surfaces and one of the second lateral surfaces on a first side of the box beam structure via peripheral regions of the first metallic web panel, and wherein the second metallic web panel is attached to the other one of the first lateral surfaces and the other one of the second lateral surfaces on a second side of the box beam structure via peripheral regions of the second metallic web panel, such that the first metallic web panel is spaced apart from and substantially parallel to the second metallic web panel.

6. The frame rail for a vehicle according to claim 5, wherein the first width is substantially the same as the second width.

7. The frame rail for a vehicle according to claim 1, wherein a shape of the first elongated structural member in a cross section that is taken in a plane normal to the length of the first elongated structural member is different than a shape of the second elongated structural member in a cross section that is taken in a plane normal to the length of the second elongated structural member.

8. The frame rail for a vehicle according to claim 1, wherein a shape of the first elongated structural member in a cross section that is taken in a plane normal to the length of the first elongated structural member is substantially the same as a shape of the second elongated structural member in a cross section that is taken in a plane normal to the length of the second elongated structural member.

9. The frame rail for a vehicle according to claim 1, wherein the first and second metallic web panels are welded to the lateral surfaces of the first and second elongated structural members.

10. The frame rail for a vehicle according to claim 1, wherein the first and second metallic web panels are mechanically fastened to the lateral surfaces of the first and second elongated structural members.

11. The frame rail for a vehicle according to claim 1, wherein the first and second metallic web panels are secured to the lateral surfaces of the first and second elongated structural members using an adhesive.

12. The frame rail for a vehicle according to claim 1, wherein the first and second elongated structural members are made from one of steel and aluminum.

13. The frame rail for a vehicle according to claim 1, wherein said first and second metallic web panels are made from one of steel and aluminum.

14. A frame rail for a vehicle, comprising:
a first elongated structural member comprising first and second structural member portions, each one of the first and second structural member portions having an outer edge and an inner edge, the inner edges of the first and second structural member portions being butt-welded together, and the outer edge of each one of the first and second structural member portions having a first flange protruding therefrom, each said first flange extending along at least a portion of a length of the first elongated structural member;
a second elongated structural member having first and second outside edges, a second flange protruding from each one of the first and second outside edges of the second elongated structural member, each said second flange extending along at least a portion of a length of the second elongated structural member; and,
first and second metallic web panels interconnecting the first and second elongated structural members so as to form a box beam structure, a material thickness of at least a major portion of each one of the first and second metallic web panels being substantially less than a material thickness of at least a major portion of each one of the first and second elongated structural members.

15. The frame rail for a vehicle according to claim 14, wherein each one of the first and second metallic web panels is substantially planar.

16. The frame rail for a vehicle according to claim 14, wherein the first metallic web panel is butt-welded along opposite edges thereof to the first flange and to the second flange on a first side of the box beam structure, and wherein the second metallic web panel is butt-welded along opposite edges thereof to the first flange and to the second flange on a second side of the box beam structure, such that the first metallic web panel is spaced apart from and substantially parallel to the second metallic web panel.

17. A frame rail for a vehicle, comprising:
an elongated structural member having a central portion and having flanges protruding from opposite lateral edges of said central portion, said flanges being substantially parallel one relative to the other and extending in a same direction away from said central portion; and,
a metallic web panel having a first sidewall portion, a second sidewall portion, and a floor portion that spans between the first sidewall portion and the second sidewall portion, the first sidewall portion being fixedly secured along an edge region thereof to one of said flanges protruding from the central portion of the elongated structural member and the second sidewall portion being fixedly secured along an edge region thereof to the other one of said flanges protruding from the central portion of the elongated structural member, and wherein at least a major portion the metallic web panel has a material thickness that is substantially less than a material thickness of at least a major portion of the elongated structural member.

18. The frame rail for a vehicle according to claim 17, wherein the elongated structural member and the metallic web panel form a box beam structure when secured together.

19. The frame rail for a vehicle according to claim 17, wherein said metallic web panel is substantially U-shaped.

20. The frame rail for a vehicle according to claim 17, wherein the first sidewall portion is substantially parallel to the second sidewall portion.

21. The frame rail for a vehicle according to claim 17, wherein each one of the first sidewall portion and the second sidewall portion is substantially planar.

22. A frame rail for a vehicle, comprising:
a pair of elongated structural members, each one of said pair of elongated structural members having flanges protruding from lateral edges thereof, said flanges of one of said pair of elongated structural members extending in a direction toward the flanges of the other one of said pair of elongated structural members; and,
first and second web panels fabricated from a composite material comprising carbon fibers and interconnecting the pair of elongated structural members so as to form a box beam structure, the first web panel fixedly secured to the flanges of the pair of elongated structural members on a first side of the box beam structure via peripheral regions of the first web panel, and the second web panel fixedly secured to the flanges of the pair of elongated structural members on a second side of the box beam structure via peripheral regions of the second web panel, such that the first web panel is spaced apart from and substantially parallel to the second web panel.

\* \* \* \* \*